United States Patent [19]
Longobardo et al.

[11] Patent Number: 5,932,502
[45] Date of Patent: Aug. 3, 1999

[54] LOW TRANSMITTANCE GLASS

[75] Inventors: Anthony Vincent Longobardo, Butler; Robert Alan Yates, McKeesport, both of Pa.

[73] Assignee: Guardian Industries Corp., Auburn Hills, Mich.

[21] Appl. No.: 08/632,536

[22] Filed: Apr. 19, 1996

[51] Int. Cl.$^6$ .............................. C03C 3/087; C03C 4/08
[52] U.S. Cl. ............................................ 501/70; 501/71
[58] Field of Search ................................ 501/64, 65, 66, 501/70, 71

[56] References Cited

U.S. PATENT DOCUMENTS

| | | | |
|---|---|---|---|
| Re. 25,312 | 1/1963 | Duncan et al. | 501/71 |
| 2,444,976 | 7/1948 | Brown | 359/361 |
| 2,688,559 | 9/1954 | Armistead | 501/71 |
| 2,699,399 | 1/1955 | Armistead | 501/61 |
| 2,923,636 | 2/1960 | Swain | 501/71 |
| 3,296,004 | 1/1967 | Duncan | 501/71 |
| 3,300,323 | 1/1967 | Plumat et al. | 501/70 |
| 3,411,934 | 11/1968 | Englehart et al. | 427/168 |
| 3,723,142 | 3/1973 | Kato et al. | 501/71 |
| 4,104,076 | 8/1978 | Pons | 501/66 |
| 4,339,541 | 7/1982 | Dela Ruye | 501/71 |
| 4,792,536 | 12/1988 | Pecoraro et al. | 501/70 |
| 4,873,206 | 10/1989 | Jones | 501/71 |
| 4,894,290 | 1/1990 | Chesworth et al. | 428/426 |
| 5,017,521 | 5/1991 | Yale et al. | 501/64 |
| 5,023,210 | 6/1991 | Krumwiede | 501/71 |
| 5,077,133 | 12/1991 | Cheng | 428/426 |
| 5,264,400 | 11/1993 | Nakaguchi et al. | 501/71 |
| 5,278,108 | 1/1994 | Cheng et al. | 501/71 |
| 5,308,805 | 5/1994 | Baker et al. | 501/71 |
| 5,318,931 | 6/1994 | Nakaguchi et al. | 501/84 |
| 5,346,867 | 9/1994 | Jones et al. | 501/71 |
| 5,352,640 | 10/1994 | Combes et al. | 501/71 |
| 5,364,820 | 11/1994 | Morimoto et al. | 501/71 |
| 5,372,977 | 12/1994 | Mazon-Ramos et al. | 501/57 |
| 5,393,593 | 2/1995 | Gulotta et al. | 428/220 |
| 5,411,922 | 5/1995 | Jones | 501/71 |
| 5,478,783 | 12/1995 | Higby et al. | 501/27 |
| 5,521,128 | 5/1996 | Jones et al. | 501/27 |
| 5,545,596 | 8/1996 | Alvarez-Casariego et al. | 501/71 |
| 5,582,455 | 12/1996 | Casariego et al. | |
| 5,700,579 | 12/1997 | Jeanvoine et al. | |
| 5,726,109 | 3/1998 | Ito et al. | 501/71 |
| 5,817,587 | 10/1998 | Jeanvoine et al. | 501/70 |
| 5,837,629 | 11/1998 | Combes et al. | 501/70 |
| 5,849,402 | 12/1998 | Kraemling et al. | 501/70 |
| 5,877,102 | 3/1999 | DuPont et al. | 501/71 |
| 5,877,103 | 3/1999 | Dupont et al. | 501/71 |

FOREIGN PATENT DOCUMENTS

| | | |
|---|---|---|
| 0482535 | 4/1992 | European Pat. Off. . |
| 0536049 | 4/1993 | European Pat. Off. . |
| 0644164 | 3/1995 | European Pat. Off. . |
| 0745566 | 12/1996 | European Pat. Off. . |
| 0748776 | 12/1996 | European Pat. Off. . |
| 0798271 | 1/1997 | European Pat. Off. . |
| 0811581 | 12/1997 | European Pat. Off. . |
| 0816296 | 1/1998 | European Pat. Off. . |
| 2082647 | 11/1971 | France . |
| 2270215 | 4/1975 | France . |
| 2331527 | 11/1975 | France . |
| 2682101 | 4/1993 | France . |
| 2690437 | 10/1993 | France . |
| 4270138 | 9/1995 | Japan . |
| 1331492 | 9/1973 | United Kingdom . |
| 9600194 | 1/1996 | WIPO . |
| 9628394 | 9/1996 | WIPO . |

OTHER PUBLICATIONS

"Colorimetry" 2nd Edition, Central Bureau of the CIE, 1986 No Month.

"Recommendations for the Integrated Irradiance and the Spectral Distribution of Simulated Solar Radiation for Testing Purposes" Central Bureau of the CIE, 1988 No Month.

C.R. Bamford "Colour Generation and Control in Glass" Amsterdam, 1977 p. 37 No Month.

Journal of the Society of Glass Tech. Dec. 1951 pp. 333–406 XXIV. "The Colour of Iron–Containing Glasses of Varying Composition".

ANSI Z26.1–1977 American National Standards Institute, Inc. Approved Jan. 26, 1977.

"Absolute Methods for Reflection Measurements" Central Bureau of the CIE, 1988 No Month.

"Minor Additions of B2O3 to Container Glass Formulations" J.P. Stevenson, vol. 126, No. 5, May 1, 1993 pp. 292–297.

*Primary Examiner*—Karl Group
*Attorney, Agent, or Firm*—Hall, Priddy & Myers

[57] ABSTRACT

Provided is a low iron containing glass particularly useful for automotive and architectural purposes which achieves low levels of UV, IR, and total solar (TS) transmittances without the use of nickel oxide, and in certain embodiments, through selective amounts of $B_2O_3$.

33 Claims, 2 Drawing Sheets

LOW TRANSMITTANCE GLASS

FIELD OF THE INVENTION

This invention relates to glasses exhibiting low light transmittance in the UV, visible, and IR energy ranges. More particularly, this invention relates to glasses uniquely suitable for automotive privacy and vision windows and for certain architectural purposes.

BACKGROUND OF THE INVENTION

The commercial use of "privacy" windows in automobiles has become widespread. Some use is also being made of such low light transmittance windows in architectural and other fields. Finding widespread use in this respect are the so-called "dark gray" glasses or "neutral gray" glasses.

Such glasses are generally formed from a standard soda-lime-silica glass composition (e.g. as used to make conventional "float" glass) to which is added various colorants to achieve the color and spectral absorption properties desired to achieve both a pleasing color (e.g. neutral gray) and low light transmittance in the UV, visible, and IR ranges (e.g. about 300–2000 nm) Foremost among these colorants is iron, made up principally of ferric and ferrous iron. While total iron content is conventionally reported as $Fe_2O_3$, it is recognized that ferric iron is a strong ultraviolet (UV) absorber while ferrous iron is a strong infrared (IR) absorber. The balancing of these two constituents (along with other known colorants such as Ce, Se, Ni, Co, Cr, Mn, Ti, V, Mo, and the like) has been found to be a difficult task given the need to achieve a truly commercially manufacturable and saleable product.

One such commercially acceptable product (and thus a successful balancing of constituents) is produced by Libbey-Owens-Ford Co. and is known as GALAXSEE solar privacy glass. It is believed that this glass and its composition are reported in U.S. Pat. No. 5,308,805. Therein a conventional soda-lime-silica base glass comprised, by weight percent, of:

SiO$_2$ 68–75
Na$_2$O 10–18
CaO 5–15
MgO 0–5
Al$_2$O$_3$ 0–5
K$_2$O 0–5 and having therein melting and refining aids such as SO$_3$, and optionally "small amounts of BaO or B$_2$O$_3$" are provided with colorants consisting essentially of, by weight percent:

| | |
|---|---|
| Fe$_2$O$_3$ (total iron) | 1.3–2 |
| NiO | 0.01–0.05 |
| Co$_3$O$_4$ | 0.02–0.04 |
| Se | 0.002–0.003 |
| Ferrous Value | 18–30% |

The glasses of this composition are said to exhibit an excitation purity less than 10%, a dominant wavelength ranging between 490–565 nm and a color defined by the conventional CIELAB color coordinates:

L*=50±10 a*=−5±5 b*=0±10

The patent specifically states "the presence of nickel (nickel oxides) is essential in compositions of the invention." (Col. 3, 1.48–49).

While in practice the GALAXSEE glass exhibits the necessary and desirable solar characteristics (including low UV and low total solar transmittances) to make it a commercially successful product, it has the drawback of necessitating the use of a significant amount (i.e. more than an inherent trace amount) of NiO to achieve its desirable results. NiO is known, for example, to present the potential problem of forming nickel sulfide stones in the glass.

While other patents have reported, and other commercial products have presented glasses which may be called neutral gray, low transmittance glasses, generally speaking they have been unable to achieve the full balance of characteristics which GALAXSEE has achieved, thereby rendering them less desirable in certain marketplaces. Examples of such patents (and perhaps products exemplified thereby) include: U.S. Pat. No. 5,023,210 [nickel-free, gray glass of low transmittance]; U.S. Pat. No. 5,411,922 [neutral gray-green nickel-free, low transmittance glasses requiring a significant amount of TiO$_2$ to achieve its results]; and U.S. Pat. No. 5,352,640 [nickel-free but requiring a high total iron content of 1.4%–4% and being, in practice, very dark in color so as to appear almost black].

It is apparent from the above that there exists a need in the art for a new glass composition which achieves the characteristics of the GALAXSEE glasses but which is "substantially nickel-free" (i.e. contains no more than an inherent trace of nickel as an impurity; namely less than about 0.0005% by weight of the glass composition).

In addition, there also exists a need in the art for a glass composition which generically achieves low UV, low IR and low total solar (TS) transmittance values in the glass without having to use high levels (e.g. greater than 1.3% by weight) total iron (Fe$_2$O$_3$) to achieve these values, regardless of whether the ultimate color achieved is a neutral gray color, or some other color that may be fully acceptable for certain other purposes in the marketplace.

It is a purpose of this invention to fulfill this and other needs in the art, more apparent to the skilled artisan, once given the following disclosure.

SUMMARY OF THE INVENTION

Generally speaking, this invention fulfills the above-described need for a neutral gray glass composition by providing:

a substantially nickel-free soda-lime-silica glass having a base glass composition comprising on a weight percent basis:

| Ingredient | Wt. % |
|---|---|
| SiO$_2$ | 68–75 |
| Na$_2$O | 10–18 |
| CaO | 5–15 |
| MgO | 0–5 |
| Al$_2$O$_3$ | 0–5 |
| K$_2$O | 0–5 | and colorants consisting essentially of by weight percent:

| | |
|---|---|
| Fe$_2$O$_3$ (total iron) | about 1.10–1.28 |
| FeO | about 0.22–0.33 |
| Co$_3$O$_4$ | about 0.018–0.025 |

| | |
|---|---|
| Se | about 0.0022–0.0040 |
| $Cr_2O_3$ | about 0.01–0.04 | wherein the percent reduction of total iron to FeO is about 19% to 30% and wherein said glass, as measured at a nominal thickness of 4 mm has a luminous transmittance less than about 24%, a total solar energy transmittance less than about 23% and has a color as defined by the following CIELAB coordinates:

$L^*=50\pm10$
$a^*=-5\pm5$
$b^*=0\pm10$

In addition, this invention fulfills a still further need in the art for a low iron content glass which nevertheless exhibits low UV and IR transmittance properties by providing:

a soda-lime-silica glass having a base composition comprising on a weight percent basis:

| | |
|---|---|
| $SiO_2$ | 68–75 |
| $Na_2O$ | 10–18 |
| CaO | 5–15 |
| MgO | 0–5 |
| $Al_2O_3$ | 0–5 |
| $K_2O$ | 0–5 |
| $B_2O_3$ | 0.05–5 | and having iron as a colorant ($Fe_2O_3$ as total iron) in an amount by weight percent of 0.5%–1.3% wherein the glass when used at the requisite thickness in either the automotive (vision or privacy) or architectural fields exhibits excellent UV, IR and TS (total solar) transmittances despite the low level of iron and in the absence of other UV or IR absorbers unless desired for further adjustment.

IN THE DRAWINGS

FIG. 1 presents transmittance vs. wavelength curves for various embodiments of this invention at a glass thickness of 0.309 inches.

DETAILED DESCRIPTION

Figure 1:
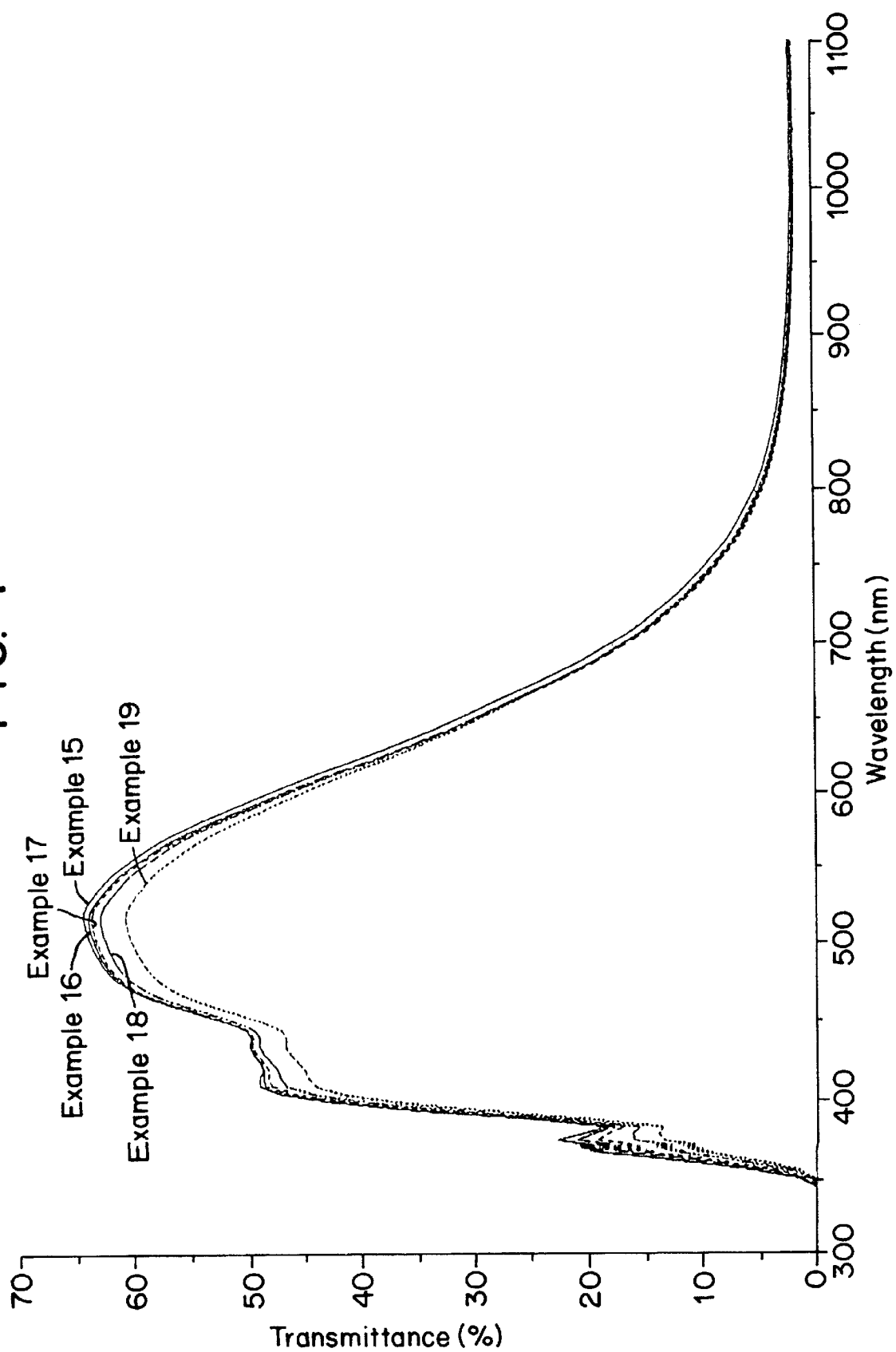

This invention envisions using conventional soda-lime-silica flat glass as its base composition, to which is then added certain colorants, and in one aspect a specific amount of $B_2O_3$, thereby to achieve its unique results. Of particularly utility in this regard are the various soda-lime-silica glasses made by the float process and generally represented, conventionally, by the following, on a weight percent basis:

| | |
|---|---|
| $SiO_2$ | 68–75 |
| $Na_2O$ | 10–18 |
| CaO | 5–15 |
| MgO | 0–5 |
| $Al_2O_3$ | 0–5 |
| $K_2O$ | 0–5 |

Other minor ingredients, including various conventional melting and refining aids, such as $SO_3$ may also be included. In the past, furthermore, it has been known to optionally include small amounts of BaO and/or $B_2O_3$.

These base glasses are well known, and the uniqueness of this invention lies in one aspect, by its unique combination of colorants added to this base composition, and in another aspect by the use of a unique amount of $B_2O_3$ in combination with a low amount of total iron, which combination has been found to unexpectedly and synergistically modify the absorption power of the ferrous and ferric iron, thereby to achieve low levels of UV, TS, and IR transmittances while maintaining the amount of total iron (and thus the ferric and ferrous content) at a low level so as to aid in the manufacturing process, and without the need for other UV or IR absorbers.

With regard to the first aspect of this invention, above-described, the compositions of this invention achieve "privacy" window characteristics. Foremost among these characteristics are (1) color, (2) luminous transmittance, and (3) total solar energy transmittance. Taking on additional importance for certain, but not all, anticipated end uses are such further characteristics as ultraviolet light (UV) transmittance, infrared energy (IR) transmittance, dominant wavelength (DW) and excitation purity (Pe).

In order to specify the parameters of these characteristics, it is generally necessary to specify the thickness of the glass which is the subject of the measurement. As used herein, in this respect, the term "a nominal thickness of 4 mm" means that the characteristics of the glass are those experienced when the thickness of the actual glass under investigation (whatever it may be) is adjusted for a thickness of about 4.01–4.17 mm (e.g. at about 0.158–0.164 inches). Such a thickness in this respect is generally recognized as a conventional thickness for float glass and a recognized thickness for determining conformance to specifications in the automotive window industry.

When at a nominal thickness of 4 mm, as aforesaid, the important characteristic of color achieved by this invention may be reported by the conventional CIELAB technique (see U.S. Pat. No. 5,308,805). Such a technique is reported in CIE Publication 15.2 (1986) and ASTM: E 308-90 [Ill. C 2° observer]. Generally speaking to meet the first aspects of this invention, the glass at a nominal 4 mm thickness will have the following CIELAB color coordinates:

$L^*=50\pm10$
$a^*=-5\pm5$
$b^*=0\pm10$

Most preferably, the CIELAB color coordinates will be:

$L^*=49\pm2$
$a^*=-4\pm2$
$b^*=3\pm2$

"Luminous transmittance" (LTa, 2° observer) is a characteristic and term well understood in the art, and is used herein in accordance with its well known meaning [see U.S. Pat. No. 5,308,805]. This term is also known as Ill. A visible transmittance (380–780 nanometers inclusive) and its measurement is made in accordance with CIE publication 15.2 (1986) and ANSI test method Z26.1. According to the first aspect of this invention, the glass at a nominal 4 mm thickness will have a luminous transmittance (LTa, 2° obs.) of less than about 24%, preferably less than 23% and most preferably between about 16%–20%.

"Total solar energy transmittance" (TS) (300–2100 nm inclusive, integrated using Simpson's Rule at 50 nm intervals using Parry Moon Air Mass=2) is another term well understood in the art [see U.S. Pat. No. 5,308,805]. It is used herein according to this well known meaning. Its measurement is conventional and well known. In the first aspect of this invention, the glasses generally exhibit a total solar energy transmittance of less than about 23%, preferably less than 19%, and most preferably between about 13%–17%.

The terms, and characteristics, of "ultraviolet light transmittance" (%UV), "infrared energy transmittance" (%IR), "dominant wavelength" (DW) and "excitation purity" (i.e. % "purity", or Pe) are also well understood terms in the art, as are their measurement techniques. Such terms are used herein, in accordance with their well known meaning [see U.S. Pat. No. 5,303,805].

"Ultraviolet transmittance" (%UV) is measured herein using Parry Moon Air Mass=2 (300–400 nm inclusive, integrated using Simpson's Rule at 10 nm intervals). Such a measurement is conventional and well known. In the preferred embodiments of this invention UV transmittance is less than about 15%, preferably less than 13%, and most preferably between about 8%–12%.

"Infrared transmittance" (%IR) is conventionally measured using Simpson's Rule and Parry Moon Air Mass=2 over the wavelength range 800–2100 nm inclusive at 50 nm intervals. Such a measurement is well known in the art. In the preferred embodiments of this invention, IR transmittance is less than about 20%, preferably less than 17%, and most preferably between about 9%–16%.

Dominant wavelength (DW) is measured conventionally in accord with the aforesaid CIE publication 15.2 (1986) and ASTM: E 308-90. In the preferred embodiments of the first aspect of this invention, the dominant wavelength is between about 490 to 565. Most preferably, they are between 520 to 565.

Excitation purity (Pe or % "purity") is measured conventionally in accord with CIE publication 15.2 (1986) and ASTM: E 308-90. In the preferred embodiments of the first aspect of this invention, the purity is less than about 11%, preferably less than 8%, and most preferably about 2.5%–6.5%.

In order to achieve the above desired characteristics of the first aspect of this invention, the above-described basic glass composition should be substantially nickel-free and should also have added thereto the following colorants and exhibit the following percent reduction of total iron to FeO, which colorants consist essentially of (by weight %):

|  | Range | Preferred |
| --- | --- | --- |
| $Fe_2O_3$ (total iron) | 1.10–1.28 | 1.24–1.26 |
| FeO | 0.22–0.33 | 0.26–0.32 |
| $Co_3O_4$ | .018–.025 | .02–.024 |
| Se | .0022–.0040 | .0025–.0035 |
| $Cr_2O_3$ | .01–.04 | .01–.025 |
| % Reduction (iron to FeO) | 19–30 | 22–28 |

In a particularly preferred composition, the base glass has added thereto colorants consisting essentially of (by weight %):

|  | Most Preferred |
| --- | --- |
| $Fe_2O_3$ (total iron) | 1.24–1.26 |
| FeO | 0.28–0.32 |
| $Co_3O_4$ | .021–.023 |
| Se | .0027–.0031 |
| $Cr_2O_3$ | 0.015–.025 |
| % Reduction (iron to FeO) | 23–27 |

In the first aspects of this invention, the use of $B_2O_3$ in the glass composition is optional. However, the most preferred embodiments do employ up to (by weight) about 5%, preferably less than 1%, most preferably less than 0.5% and in certain embodiments between about 0.26%–0.27%.

The term "% reduction (iron co FeO)" is a term well understood in the art. It is used herein in accordance with this well known meaning, and is calculated according to the methodology used in U.S. Pat. No. 5,308,805 (reported as "ferrous value").

The term "substantially nickal-free" is used herein to denote that no nickel is affirmatively added to the batch ingredients. Ideally, the glasses of this invention would be completely free of any nickel, but this is not usually possible to achieve due to impurities in the other batch ingredients employed. Thus, the term "substantially nickel-free" encompasses such small amounts of NiO as a trace impurity which should not exceed about 0.0005% by weight in the glass.

As discussed above, the use of $B_2O_3$, when used in the above-described ranges, has been found to achieve a unique result which takes its use beyond just the "privacy" glass or "neutral gray" glass art. This unique result (or synergistic effect) is that when $B_2O_3$ is used in a conventional float glass composition, as aforesaid, along with iron (ferrous and ferric) as a colorant, for some reason not fully understood, a lower amount of iron may be used than would normally be anticipated for use in order to achieve a proper low level of TS, IR and UV transmittances.

With respect to this second aspect of our invention, then, it is contemplated for many intended uses that the iron content in a conventional soda-lime-silica glass (as described herein) will normally not exceed 1.3% by weight of the glass, preferably be between 0.5–1.3% by weight and most preferably be about 0.8–0.9% by weight of the glass. In like manner, when these amounts of iron are present, the amount of $B_2O_3$ employed (by wt. % of the glass) will usually be 0.05%–5%, preferably 0.05%–1.0%, and most preferably about 0.1%–0.5%.

In such glasses, of course, color and other properties may be adjusted with the addition of other ingredients, as can further reductions of UV, IR, and TS transmittance, by additions of such known ingredients for that purpose.

Figure 2:
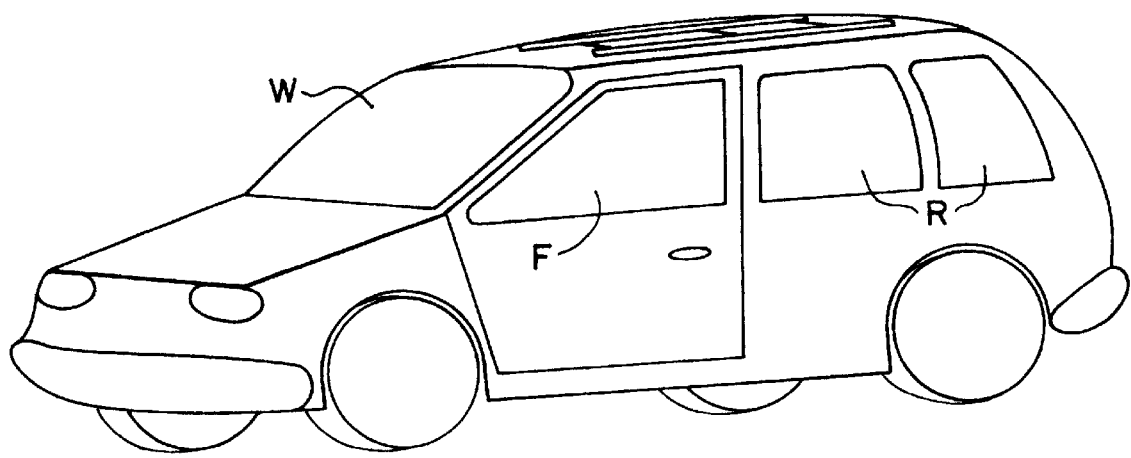
FIG. 2 is a side plan view of an automobile having a window and windshield embodying this invention.
Figure 3:
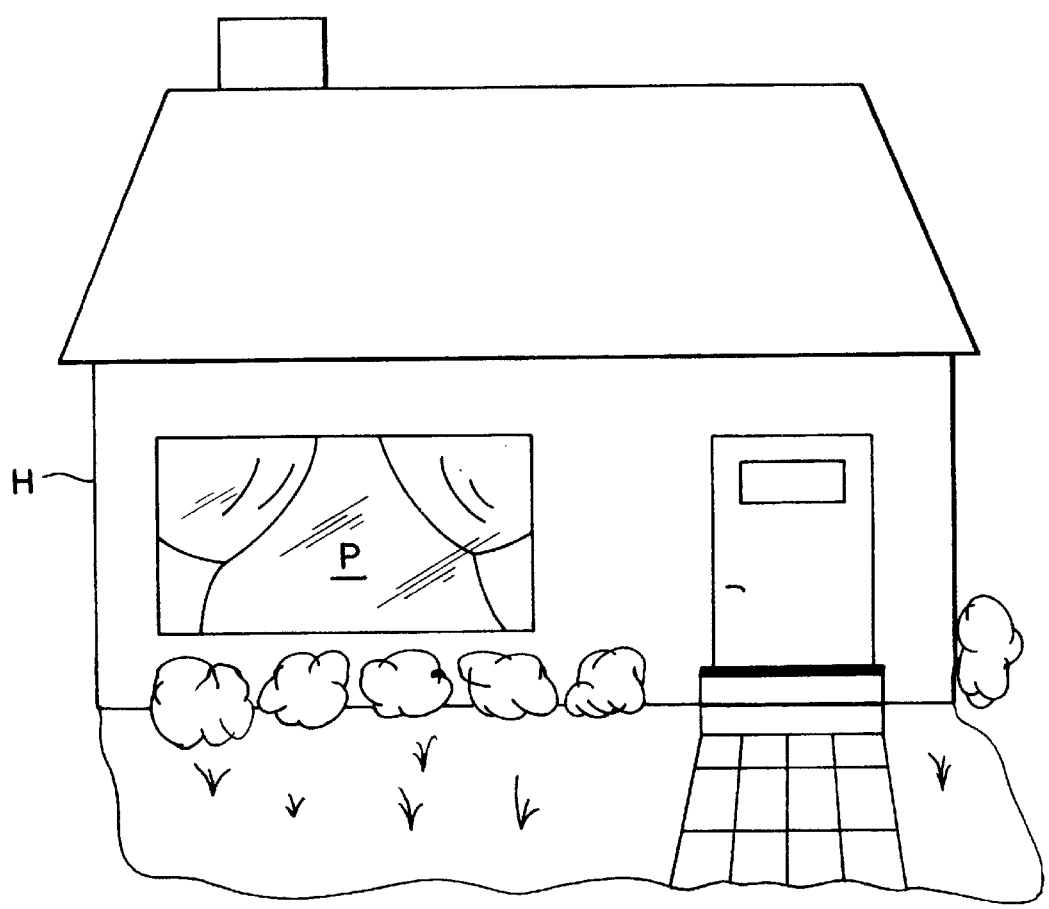
FIG. 3 is a front plan view of a dwelling having an architectural window embodying this invention.

The glasses envisioned in this second aspect of this invention may generally be separated into "automotive" and "architectural" glasses (e.g. FIG. 3, window pane "P" in house "H") . . . indicating their end uses. In the "automotive" market, the glasses are separated into two subset end uses, the first for "vision" (e.g. FIG. 2, nonprivacy, front windshield "W" and front side windows "F") and the other for "privacy" (e.g. FIG. 2, rear side windows "R"). Rear window (not shown) would also usually be "privacy". Typical characteristics achievable in these three fields of use when employing the above amounts of $B_2O_3$ in the above-described low iron containing glasses [at a "nominal thickness of 4 mm" (as hereinbefore defined) for "automotive" uses and at a "nominal thickness of 6 mm" (i.e. 5.56 mm–6.20 mm) for "architectural" uses] are as follows:

| Characteristic | Vision | Privacy | Architectural |
| --- | --- | --- | --- |
| % LTa (2° obs) | 70–80 | 10–20 | 20–70 |
| % UV | <40 | <15 | <30 |
| % IR | <25 | <15 | <30 |
| % TS | <45 | <25 | <40 |

This invention will now be described with respect to certain examples and embodiments.

EXAMPLES 1–11

Eleven (11) exemplar glasses were formulated from the basic batch ingredients as follows (based on 1000 parts of sand) in a multi-step process:

| INGREDIENT (Parts) | WEIGHT |
|---|---|
| Sand | 1000 |
| Soda ash | 318 |
| Dolomite | 244.22 |
| Limestone | 85.52 |
| Salt cake | 14.25 |
| Rouge | 14.13 |
| Carbon | 0.74 |
| Sodium nitrate | 2.25 |

This glass was then melted using conventional techniques and formed into cullet. The cullet was dark green and was of the following composition by weight %:

| | |
|---|---|
| $SiO_2$ (XRF, BD) | 72.35, 72.40 |
| $Na_2O$ | 13.75 |
| CaO | 8.72 | the glass. Fritting included pouring the melt into water, crushing it into a powder, drying the powder and remelting it. Fritting was used to accelerate homogenization.

The final melt was cast into glass buttons using a graphite mold. The buttons were annealed for 1 hr. at 1150° F. and then allowed to cool to room temperature. Each glass sample was then ground and polished on two sides, and the requisite spectral measurements were made. Thereafter the samples were subjected to wavelength dispersive X-ray fluorescence analysis to determine the various oxide components present. Boron was measured wet chemically using ICP (Inductively Coupled Plasma spectroscopy). FeO % reduction was determined using the method set forth in the aforesaid U.S. Pat. No. 5,308,805 (except a factor of 113 instead of the reported 110 was used here). Percent transmittance used here is at 1050 nm and not at 1060 nm as reported in this '805 patent. The spectral properties reported are for a thickness of 4.09 mm (i.e. 0.161 inches) of the glass.

TABLE NO. 1

| EXAMPLE | 1 | 2 | 3 | 4 | 5 | 6 | 7 | 8 | 9 | 10 | 11 | 12 | 13 |
|---|---|---|---|---|---|---|---|---|---|---|---|---|---|
| Dark Green Cullet (g) | 100 | 100 | 100 | 100 | 100 | 100 | 100 | 100 | 100 | 100 | 100 | | |
| Fe2O3 (g) | 0.324 | 0.324 | 0.324 | 0.374 | 0.374 | 0.374 | 0.374 | 0.374 | 0.374 | 0.374 | 0.374 | | |
| Co3O4 (g) | 0.02 | 0.019 | 0.021 | 0.02 | 0.02 | 0.02 | 0.02 | 0.02 | 0.02 | 0.02 | 0.02 | | |
| Se metal (g) | 0.017 | 0.017 | 0.02 | 0.023 | 0.027 | 0.026 | 0.027 | 0.025 | 0.026 | 0.025 | 0.026 | | |
| Cr2O3 (g) | 0.025 | 0.025 | 0.025 | 0.025 | 0.025 | 0.025 | 0.025 | 0.025 | 0.025 | 0.025 | 0.025 | | |
| Carbon (g) | — | — | — | 0.003 | 0.005 | 0.004 | 0.004 | 0.004 | 0.004 | 0.004 | 0.004 | | |
| Total Iron wt % | 1.15 | 1.16 | 1.17 | 1.19 | 1.22 | 1.21 | 1.21 | 1.21 | 1.21 | 1.20 | 1.22 | 1.19 | 1.24 |
| % T (1050 nm) | 14.53 | 12.31 | 14.20 | 6.20 | 5.97 | 8.98 | 11.76 | 10.75 | 9.111 | 12.43 | 9.80 | 10.30 | 8.11 |
| Spectral FeO wt % | 0.223 | 0.242 | 0.226 | 0.322 | 0.326 | 0.279 | 0.248 | 0.258 | 0.27 | 0.241 | 0.269 | 0.263 | 0.291 |
| % Reduction | 19.4 | 20.8 | 19.3 | 27.0 | 26.8 | 23.1 | 20.5 | 21.4 | 22.8 | 20.1 | 22.1 | 22.2 | 23.5 |
| Co3O4 wt % | 0.0184 | 0.0180 | 0.0215 | 0.0202 | 0.0200 | 0.0196 | 0.0180 | 0.0189 | 0.0157 | 0.0182 | 0.0161 | 0.0200 | 0.0206 |
| Se wt % | 0.0022 | 0.0026 | 0.0030 | 0.0021 | 0.0018 | 0.0027 | 0.0029 | 0.0027 | 0.0023 | 0.0031 | 0.0027 | 0.0032 | 0.0028 |
| Cr2O3 wt % | 0.0197 | 0.0205 | 0.0220 | 0.0220 | 0.0220 | 0.0220 | 0.0220 | 0.0208 | 0.0218 | 0.0227 | 0.0218 | 0.0212 | 0.0223 |
| B2O3 wt % | — | — | — | — | — | — | — | — | — | — | — | | |
| Thickness | 0.1610 | 0.1610 | 0.1610 | 0.1610 | 0.1610 | 0.1610 | 0.1610 | 0.1610 | 0.1610 | 0.1610 | 0.1610 | 0.1610 | 0.1610 |
| % Lta 2° Obs. | 23.76 | 20.78 | 17.71 | 17.13 | 18.35 | 17.63 | 19.23 | 20.42 | 23.03 | 19.89 | 21.68 | 19.63 | 18.02 |
| % UV | 11.93 | 9.48 | 8.26 | 9.45 | 10.62 | 9.23 | 8.77 | 10.08 | 10.95 | 9.13 | 9.90 | 9.82 | 9.34 |
| % Total Solar | 22.07 | 20.25 | 17.73 | 13.87 | 14.51 | 15.75 | 18.05 | 18.24 | 18.25 | 18.80 | 17.94 | 18.27 | 16.18 |
| % IR | 19.26 | 18.75 | 16.60 | 9.92 | 9.67 | 13.07 | 16.16 | 15.12 | 13.38 | 16.87 | 14.01 | 15.60 | 13.05 |
| Dom. Wave. | 514.72 | 558.92 | 563.62 | 537.85 | 494.07 | 564.61 | 567.56 | 547.51 | 551.78 | 562.69 | 560.20 | 557.50 | 546.92 |
| Purity | 2.56 | 6.55 | 7.97 | 3.67 | 6.33 | 8.85 | 10.90 | 4.29 | 5.89 | 8.25 | 8.17 | 5.19 | 3.89 |
| x | 0.3031 | 0.3137 | 0.3172 | 0.3066 | 0.2922 | 0.3186 | 0.3228 | 0.3090 | 0.3103 | 0.3169 | 0.3154 | 0.3124 | 0.3089 |
| y | 0.3289 | 0.3370 | 0.3389 | 0.3328 | 0.3209 | 0.3407 | 0.3441 | 0.3331 | 0.3378 | 0.3402 | 0.3414 | 0.3332 | 0.3317 |
| L* | 56.16 | 52.60 | 48.89 | 48.56 | 50.59 | 48.76 | 50.53 | 52.37 | 55.19 | 51.50 | 53.58 | 51.30 | 49.53 |
| a* | −4.91 | −3.27 | −2.35 | −3.93 | −5.78 | −2.35 | −2.05 | −3.72 | −4.71 | −2.96 | −3.89 | −2.47 | −3.04 |
| b* | 1.89 | 4.52 | 4.86 | 2.59 | −1.05 | 5.36 | 6.68 | 3.18 | 4.58 | 5.39 | 5.74 | 3.33 | 2.58 |

-continued

| | |
|---|---|
| MgO | 3.81 |
| $Al_2O_3$ | 0.16 |
| $K_2O$ | 0.04 |
| $SO_3$ | 0.02 |
| $TiO_2$ | 0.04 |
| $Fe_2O_3$ | 0.88 |
| FeO | 0.23 |

This base glass cullet (in 100 grm samples) was then admixed with the additional coloring compounds and melting agents (in varying amounts) as indicated in the following table. The colorant compounds and agents used were iron oxide ($Fe_2O_3$), selenium metal powder (Se), cobalt oxide powder ($Co_3O_4$), chromium oxide powder ($Cr_2O_3$) and carbon (coke). The $Cr_2O_3$ powder was finely ground to minimize the potential for the formation of chromite stones. Each separate example was then placed in a platinum metal crucible and melted in an electric furnace at 2800° F. for 4½ hrs. The melt was then removed from the furnace once to frit

EXAMPLES 12–13

The following exemplar glasses were formulated on a commercial scale operation using a conventional "Siemens"—type continuous melting furnace.

BATCH INGREDIENTS
(Based on 1000 parts of sand)

| Example 13 (parts) | Ingredient | Example 12 (parts) |
|---|---|---|
| 1000 | Sand | 1000 |
| 324.17 | Soda ash | 324.17 |
| 247.5 | Dolomite | 247.5 |
| 83.08 | Limestone | 83.08 |
| 13.33 | Borax | 13.33 |
| 8.5 | Salt cake | 8.5 |
| 26.46 | Rouge | 26.66 |
| 1.29 | Iron chromite | 1.408 |
| 0.59 | Cobalt oxide | 0.57 |

-continued

BATCH INGREDIENTS
(Based on 1000 parts of sand)

| Example 13 (parts) | Ingredient | Example 12 (parts) |
|---|---|---|
| 0.45 | Selenium | 0.425 |
| 1137 | Cullet | 1137 |

The amount of rouge and other colorants reported reflect the adjustment necessitated by the cullet used.

These batches were melted and formed into glass sheets of 0.161 inch thick (4.09 mm) on a conventional float glass (tin bath) line. Analysis (by the aforesaid techniques) revealed the following final basic glass compositions by weight % (the colorant amounts by wt. % being reported in Table 1 above):

| Component | Ex. 12 | Ex. 13 |
|---|---|---|
| $SiO_2$ | 70.64 | 70.69 |
| $Na_2O$ | 13.62 | 13.69 |
| CaO | 8.72 | 8.74 |
| MgO | 3.74 | 3.76 |
| $SO_3$ | 0.209 | 0.205 |
| $K_2O$ | 0.054 | 0.051 |
| $Al_2O_3$ | 0.225 | 0.220 |
| $TiO_2$ | 0.022 | 0.023 |

All of examples Nos. 1–13 had no more than a trace amount of NiO (i.e. less than 0.0005 wt. %).

EXAMPLE 14

Using substantially the same amounts of batch ingredients set forth above, another exemplar glass was formed on a standard float line tin bath. The resulting glass (averaging tin side and air side composition analysis) had the following composition by wt. %:

| Component | Wt. % |
|---|---|
| $SiO_2$ | 71.29 |
| $Na_2O$ | 13.69 |
| CaO | 8.752 |
| MgO | 3.781 |
| $SO_3$ | 0.206 |
| $K_2O$ | 0.0505 |
| $Al_2O_3$ | 0.216 |
| $TiO_2$ | 0.023 |
| $B_2O_3$ | 0.27 (% by ICP) |
| $Fe_2O_3$ | 1.252 |
| Se | 0.0030 |
| $Cr_2O_3$ | 0.0228 |
| $Co_3O_4$ | 0.0210 |

The composition contained no more than a trace amount of NiO. The resulting glass had a thickness of 4.09 mm (0.161 inches) and was found to have the following characteristics:

| | | | |
|---|---|---|---|
| LTa (%) | 17.44 | x | 0.3102 |
| UV (%) | 8.95 | y | 0.3332 |
| IR (%) | 12.35 | L* | 48.78 |
| TS (%) | 15.50 | a* | −2.96 |
| DW (nm) | 551.38 | b* | 2.95 |
| Pe (%) | 4.60 | | |

The "x" and "y" reported are the conventional CIE color coordinates according to CIE publication 15.2 (1986) and ASTM: E 308-90, for Ill. C. The spectral FeO wt. % was 0.30 and the % reduction was 24.0. The % T (transmission) at 1050 nm was 7.55 (i.e. used to calculate the % reduction as per U.S. Pat. No. 5,308,805, reported as ferrous value therein).

EXAMPLES 15–19

The following examples are presented to demonstrate the second aspect of our invention wherein it has been found that $B_2O_3$ has a surprising and synergistic effect upon glasses containing $Fe_2O_3$ and not just the unique "privacy" glasses of the first aspect of this invention as demonstrated in the above Examples 1–14.

In these examples basically the same batch ingredients as used in Examples 1–11 to formulate the initial dark green glasses were used except that in these Examples 15–19 boric acid was added in varying amounts to determine the effect on the absorption properties. Carbon was added (as reported below) in parts per 100 parts of basic glass cullet, as was the boric acid. Thus, cullet was first formed and admixed with the requisite amounts of boric acid and carbon to obtain the listed results.[1] The glass was then remelted and analysis performed to determine the final composition and characteristics.

[1] No boric acid or carbon was added to Ex. 15. The additions (in parts) to the other Examples are as follows:

| | Ex. 16 | 17 | 18 | 19 |
|---|---|---|---|---|
| Boric acid | .9 | 1.8 | 3.6 | 5.4 |
| Carbon | .06 | .12 | 2.0 | .36 |

Test melts Nos. 16–19 were reduced with carbon to decrease the transmittance due to FeO below the test melt with substantially no boron (i.e. No. 15 contains only a small amount of boron due to impurity in the batch) to eliminate any possible influence on transmittance due to oxidation effects. Boric acid and carbon were added without compensating for $Fe_2O_3$ purposely so that there would be less total $Fe_2O_3$ in the test melts containing boron so that any possibility of the boron test melts containing more $Fe_2O_3$ would be eliminated.

The reason for the two reported $Fe_2O_3$ (total iron) amounts is to present the results obtained by XRF analysis and by calculation. It is believed that the calculated amounts are more accurate due to an apparent interference that occurred during the XRF analysis. This aberration, of course, does not affect the validity of the conclusions reached. The first reported measurements were at the actual thicknesses of the samples (e.g. 0.312, etc.). The next measurement reported reflects an adjustment thereof for a thickness of 0.309 inches and are believed to be the results which are the most precise. Then, to look at the glass from the perspective of both architectural use and automotive use, the measurements reported were again adjusted to simulate a glass thickness of 0.219 inches and 0.161 inches, respectively. The results obtained are reported in the following table:

TABLE NO. 2

|  |  | 15 | 16 | 17 | 18 | 19 |
|---|---|---|---|---|---|---|
| Chemical Composition: | Na2O | 13.743 | 13.654 | 13.561 | 13.410 | 13.227 |
|  | CaO | 8.718 | 8.716 | 8.717 | 8.725 | 8.711 |
|  | MgO | 3.813 | 3.796 | 3.779 | 3.743 | 3.724 |
|  | Al2O3 | 0.173 | 0.173 | 0.174 | 0.175 | 0.181 |
|  | SO3 | 0.146 | 0.123 | 0.108 | 0.109 | 0.068 |
|  | K2O | 0.043 | 0.043 | 0.042 | 0.041 | 0.041 |
|  | TiO2 | 0.039 | 0.039 | 0.040 | 0.039 | 0.040 |
|  | SiO2 (BD) | 72.411 | 72.056 | 71.680 | 70.862 | 70.104 |
|  | SiO2 (XRF) | 71.425 | 71.197 | 71.056 | 70.541 | 70.330 |
|  | Fe2O3 (XRF) | 0.894 | 0.900 | 0.899 | 0.896 | 0.904 |
|  | Fe2O3 (Calc.) | 0.894 | 0.888 | 0.882 | 0.872 | 0.860 |
| Approximate Percentage: | B2O3 | 0.02 | 0.5 | 1 | 2 | 3 |
| Thickness(inches): |  | 0.312 | 0.338 | 0.297 | 0.313 | 0.304 |
| Illuminant A - 2° Observer: |  | 52.71 | 49.42 | 52.85 | 50.95 | 50.34 |
| UV Solar: |  | 20.24 | 17.63 | 19.66 | 16.90 | 15.71 |
| Total Solar: |  | 24.59 | 22.40 | 24.72 | 23.56 | 23.51 |
| IR Solar: |  | 3.62 | 2.50 | 3.58 | 3.20 | 3.61 |
| Thickness converted to (inches): |  | 0.309 | 0.309 | 0.309 | 0.309 | 0.309 |
| Illuminant A - 2° Observer: |  | 52.98 | 52.01 | 51.73 | 51.32 | 49.86 |
| UV Solar: |  | 20.47 | 19.68 | 18.76 | 17.18 | 15.37 |
| Total Solar: |  | 24.78 | 24.13 | 23.93 | 23.81 | 23.18 |
| IR Solar: |  | 3.72 | 3.29 | 3.19 | 3.32 | 3.44 |
| Thickness converted to (inches): |  | 0.219 | 0.219 | 0.219 | 0.219 | 0.219 |
| Illuminant A - 2° Observer: |  | 61.91 | 61.09 | 60.85 | 60.52 | 59.31 |
| UV Solar: |  | 29.00 | 28.12 | 27.00 | 25.14 | 23.10 |
| Total Solar: |  | 32.25 | 31.44 | 31.20 | 31.16 | 30.70 |
| IR Solar: |  | 8.81 | 8.02 | 7.83 | 8.08 | 8.32 |
| Thickness converted to (inches): |  | 0.161 | 0.161 | 0.161 | 0.161 | 0.161 |
| Illuminant A - 2° Observer: |  | 68.57 | 67.88 | 67.68 | 67.42 | 66.43 |
| UV Solar: |  | 36.95 | 36.09 | 34.78 | 32.80 | 30.72 |
| Total Solar: |  | 39.68 | 38.75 | 38.48 | 38.51 | 38.19 |
| IR Solar: |  | 15.86 | 14.75 | 14.48 | 14.84 | 15.19 |

The significance of our discovery is apparent from a comparison of the results in this Table and the curves of FIG. 1. Through the addition of boron in the requisite amount, according to this invention, to a soda-lime-silica glass which contains low amounts of iron, the glass will exhibit a more desirable combination of transmittance properties; particular UV, total molar (TS) and IR transmittances at a lower level of total iron than would be needed if boron were not added.

While this phenomenon is not entirely understood, it appears to be that the introduction of boron into a soda-lime-silica glass which contains iron alters the absorption of ferric and ferrous iron. Adding boron to a glass which contains iron results in what may appear to be, on first impression, a decrease in ferrous absorption while the ferric absorption increases. At first glance, then, the decrease in ferrous absorption and increase in ferric absorption appears to be redox related, i.e. conversion of ferrous to ferric iron through oxidation. However, this is not a redox effect because it has been discovered that after reducing the glasses which contain boron to obtain at least the original amount of ferrous absorption in a glass without boron, there is an overall increase in ferric absorption in the glass with boron as reflected in the UV results in the above Table and FIG. 1. In other words, a soda-lime-silica glass which contains iron has more total light absorption power when boron is present than does the glass without boron. The reducing agent used in this case was carbon, though other reducing agents, or less oxidation agents, may be used to accomplish the same goal.

It also appears to be the case that as the boron is increased in a soda-lime-silica glass which contains iron, and the glass is reduced or less oxidized, the light transmittance in the visible region may decrease, and it may be necessary to decrease the total iron to maintain the original light transmittance in the visible region, though the resultant glass would have the same or more desirable UV Solar (UV), Total Solar (TS), or Infrared Solar (IR) transmittance properties with less total iron. In other words, a glass with similar light transmittance in the visible region can be produced with boron in the glass using less total iron than is possible without boron. Also, as the boron is increased, the traditional transmittance peak normally associated with ferric transmittance at 370 nanometers (resulting from ferric absorption at 380 nanometers) is significantly altered by some type of additional absorption, resulting in more desirable UV absorption, as demonstrated in FIG. 1.

This concept may be used in all soda-lime-silica glass compositions which contain iron; namely, green, blue, gray, bronze, etc.—both light and dark versions of each.

Once given the above disclosure, many other features, modifications and improvements will become apparent to the skilled artisan. Such other features, modifications and improvements are considered to be a part of this invention, the scope of which is to be determined by the following claims:

We claim:

1. A substantially nickel-free soda-lime-silica glass having a base glass composition comprising on a weight percent basis:

| | |
|---|---|
| $SiO_2$ | 68–75 |
| $Na_2O$ | 10–18 |
| CaO | 5–15 |
| MgO | 0–5 |
| $Al_2O_3$ | 0–5 |
| $K_2O$ | 0–5 | and colorants consisting essentially of by weight percent:

| | |
|---|---|
| $Fe_2O_3$ (total iron) | about 1.10–1.28 |
| FeO | about 0.22–0.33 |

| | |
|---|---|
| Co$_3$O$_4$ | about 0.018–0.025 |
| Se | about 0.0022–0.0040 |
| Cr$_2$O$_3$ | about 0.01–0.04 | wherein the percent reduction of total iron to FeO is about 19% to 30% and wherein the glass, as measured at a nominal thickness of 4 mm has a luminous transmittance less than about 24%, a total solar energy transmittance of less than about 23% and has a color as defined by the following CIELAB coordinates:

$$L^* = 50 \pm 10$$
$$a^* = -5 \pm 5$$
$$b^* = 0 \pm 10.$$

2. A glass according to claim 1 wherein said glass has a color as defined by the following CIELAB coordinates:

$$L^* = 49 \pm 2$$
$$a^* = -4 \pm 2$$
$$b^* = 3 \pm 2.$$

3. A glass according to claim 1 wherein said glass as measured at said nominal thickness has a luminous transmittance of less than 23%.

4. A glass according to claim 3 wherein said luminous transmittance is between about 16%–20%.

5. A glass according to claim 1 wherein said glass as measured at said nominal thickness has a total solar energy transmittance of less than 19%.

6. A glass according to claim 5 wherein said total solar energy transmittance is between about 13%–17%.

7. A glass according to claims 1, 3 or 5 wherein said glass when measured at said nominal thickness has an ultraviolet transmittance of less than about 15%.

8. A glass according to claim 7 wherein said ultraviolet transmittance is less than 13%.

9. A glass according to claim 7 wherein said ultraviolet transmittance is between about 8%–12%.

10. A glass according to claims 1, 3 or 5 wherein said glass when measured at said nominal thickness has an infrared transmittance of less than about 20%.

11. A glass according to claim 10 wherein said infrared transmittance is less than 17%.

12. A glass according to claim 10 wherein said infrared transmittance is between about 9%–16%.

13. A glass according to claims 1, 3 or 5 wherein said glass when measured at said nominal thickness has a dominant wavelength of between 490–565.

14. A glass according to claim 13 wherein said dominant wavelength is between 520–565.

15. A glass according to claims 1, 3 or 5 wherein said glass when measured at said nominal thickness has an excitation purity of less than about 11%.

16. A glass according to claim 15 wherein said excitation purity is less than 8%.

17. A glass according to claim 15 wherein said excitation purity is between about 2.5%–6.5%.

18. A glass according to claim 1 wherein the glass when measured at said nominal thickness exhibits the following characteristics:

| Characteristic | Amount |
|---|---|
| % LTa (2° obs.) | 16–20 |
| % TS | less than 17 |
| % UV | less than 13 |
| % IR | less than 17 |
| Color (CIELAB) | L* = 47 – 51 |
| | a* = –4 ± 2 |
| | b* = 3 ± 2. |

19. A glass according to claim 18 wherein said glass composition further includes B$_2$O$_3$ in an amount between 0.05%–5% by weight.

20. A glass according to claim 19 wherein said B$_2$O$_3$ is in an amount less than 1%.

21. A glass according to claim 19 wherein said B$_2$O$_3$ is in an amount less than 0.5%.

22. A glass according to claim 19 wherein said B$_2$O$_3$ is in an amount of between about 0.26%–0.27% and said total iron is between about 1.24%–1.26%.

23. A soda-lime-silica glass having a base composition comprising on a weight percent basis:

SiO$_2$ 68–75
Na$_2$O 10–18
CaO 5–15
MgO 0–5
Al$_2$O$_3$ 0–5
K$_2$O 0–5
B$_2$O$_3$ 0.05–5 and further comprising Fe$_2$O$_3$ (total iron) as a colorant in an amount by weight percent of 0.5%–1.3%.

24. A glass according to claim 23 wherein said glass is an automotive vision window, and wherein said % LTa is 70–80.

25. A glass according to claim 23 wherein said glass has the following characteristics when measured at a nominal thickness of 4 mm:

% LTa (2° obs.)=10–20
% UV=less than 15
% IR=less than 15
% TS=less than 25.

26. A glass according to claim 25 wherein said glass is an automotive privacy window.

27. A glass according to claim 23 wherein said iron is in an amount of about 0.8%–0.9% by weight and said B$_2$O$_3$ is in an amount of about 0.05%–1.0% by weight.

28. A glass according to claim 27 wherein said B$_2$O$_3$ is in an amount of about 0.1%–0.5%.

29. A soda-lime-silica glass having a base composition comprising on a weight percent basis:

SiO$_2$ 68–75
Na$_2$O 10–18
CaO 5–15
MgO 0–5
Al$_2$O$_3$ 0–5
K$_2$O 0–5
B$_2$O$_3$ 0.05–5 and further comprising Fe$_2$O$_3$ (total iron) as a colorant in an amount by weight percent of 0.5%–1.3%, wherein said glass when measured at a nominal thickness of 6 mm has the following characteristics:

% LT$_a$ (2° obs.)=20–70
% UV=less than 30

% IR=less than 30

% TS=less than 40.

30. A glass according to claim 29 wherein said glass is an architectural window.

31. A glass according to claim 23 wherein said glass when measured at a nominal thickness of 4 mm has a % LTa (2° obs.) of 10–80.

32. A glass according to claim 31 wherein said glass has the following further characteristics:

% UV=less than 40

% IR=less than 25

% TS=less than 45.

33. A glass according to claims 29 or 32 wherein said characteristics at said nominal thickness are achieved without any additional UV or IR adjusting ingredients.

* * * * *